US 12,072,888 B1

(12) United States Patent
Lasch et al.

(10) Patent No.: US 12,072,888 B1
(45) Date of Patent: Aug. 27, 2024

(54) COOPERATIVE MEMORY MANAGEMENT IN DATABASE MANAGEMENT SYSTEMS

(71) Applicant: SAP SE, Walldorf (DE)

(72) Inventors: Robert Lasch, Walldorf (DE); Thomas Legler, Walldorf (DE); Norman May, Karlsruhe (DE); Kai-Uwe Sattler, Ilmenau (DE); Bernhard Scheirle, Leimen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/316,624

(22) Filed: May 12, 2023

(51) Int. Cl.
*G06F 16/00* (2019.01)
*G06F 16/22* (2019.01)
*G06F 16/2455* (2019.01)
*G06F 16/25* (2019.01)

(52) U.S. Cl.
CPC ...... *G06F 16/2456* (2019.01); *G06F 16/2282* (2019.01); *G06F 16/252* (2019.01)

(58) Field of Classification Search
CPC . G06F 16/2456; G06F 16/2282; G06F 16/252
See application file for complete search history.

(56) References Cited

U.S. PATENT DOCUMENTS

| | | | | |
|---|---|---|---|---|
| 2015/0286661 | A1* | 10/2015 | DeLuca | G06F 16/217 707/727 |
| 2015/0363113 | A1* | 12/2015 | Rahman | G06F 9/4881 711/170 |
| 2018/0074970 | A1* | 3/2018 | Gropengiesser | G06F 12/1009 |
| 2018/0300067 | A1* | 10/2018 | Mittal | G06F 3/0631 |
| 2020/0387511 | A1* | 12/2020 | Sherkat | G06F 3/0673 |
| 2022/0335047 | A1* | 10/2022 | Samanta | G06F 11/3409 |

* cited by examiner

*Primary Examiner* — Cheryl Lewis
(74) *Attorney, Agent, or Firm* — Fountainhead Law Group, PC

(57) ABSTRACT

Embodiments of the present disclosure include techniques for cooperative memory management. In one embodiment, a database management system includes a memory manager for managing a memory buffer. The memory buffer is configured to allocate memory to table data and temporary data dynamically. In some embodiments, table data memory allocations are reduced and temporary data memory allocations are increased to process queries. Temporary data memory allocations may be increased to store temporary data associated with one or more portions of a query. The memory buffer reallocates table data memory allocations and temporary data memory allocations as needed to more efficiently use available memory.

20 Claims, 5 Drawing Sheets

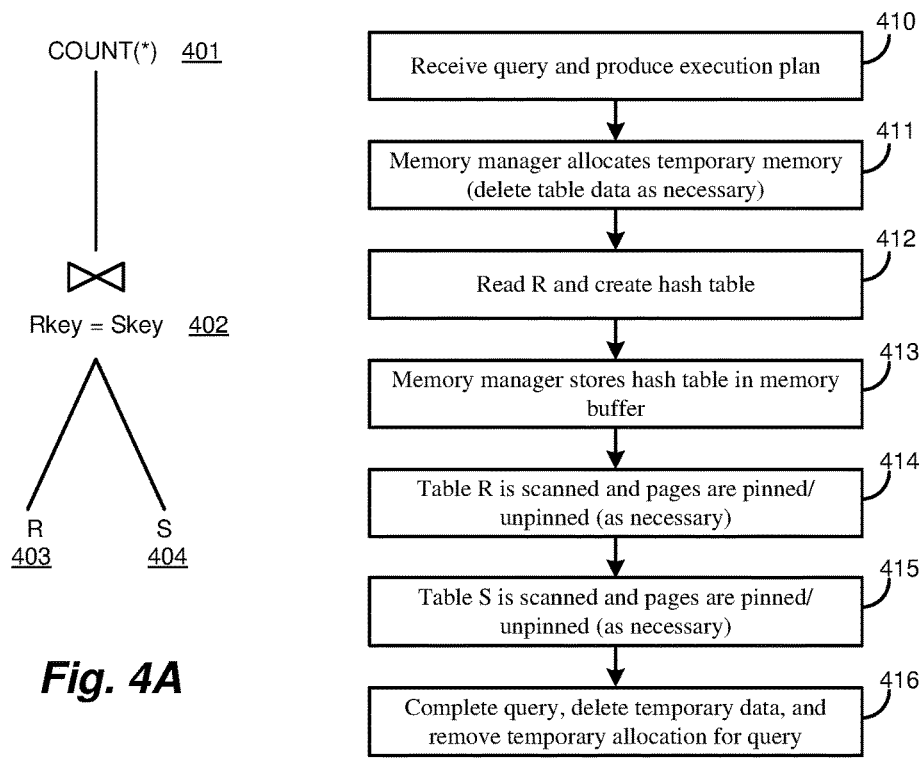
Fig. 4A
Fig. 4B
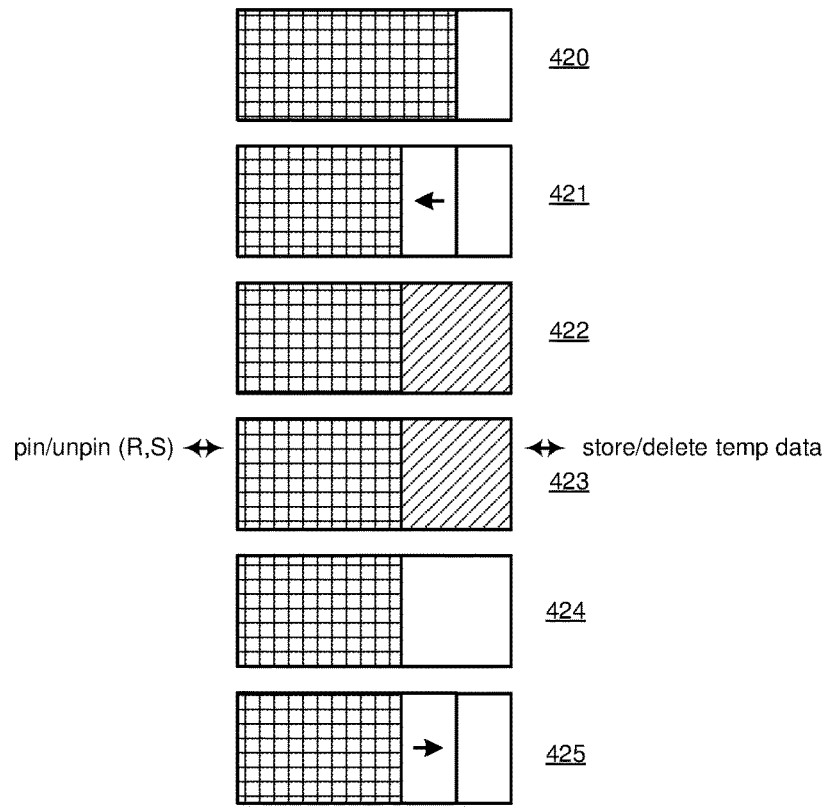
Fig. 4C

COOPERATIVE MEMORY MANAGEMENT IN DATABASE MANAGEMENT SYSTEMS

BACKGROUND

The present disclosure relates generally to database software systems, and in particular, to cooperative memory management in database management systems.

Main memory requirements are a significant factor for the cost of operating a database management system (DBMS). In systems running analytical or mixed analytical and transactional workloads, while many individual consumers require memory, the majority of the memory capacity is required by two consumers. First, table data is loaded and held in memory to read and update it. Second, running complex analytical queries requires memory for temporary data.

Traditionally, disk-based systems manage the memory used for table data separately from all other memory. They load table data from storage into memory through a buffer manager, which manages a pool of memory to cache accessed table data. The size of this pool is user-configured and memory allocated to it cannot be used for other consumers in the system like temporary data.

However, the traditional paradigm for managing memory leads to several issues. As the buffer pool size needs to be configured such that enough memory capacity is left to hold the peak amount of temporary data created by any query in the workload, significant parts of the memory capacity left for temporary data will remain unused in the times when smaller or no queries are executing. This is problematic since the unused capacity could be used to cache more table data, improving throughput for the transactional part of the workload. Furthermore, configuring an adequate size for the buffer pool can be time consuming and error prone and result in queries failing or having to spill to disk if too little memory capacity is left for temporary data.

The present disclose is directed to techniques for improving memory allocation in database management systems.

BRIEF DESCRIPTION OF THE DRAWINGS

FIG. 4A illustrates an example query execution plan according to an embodiment.

FIG. 4B illustrates steps performed during query execution according to an embodiment.

FIG. 4C illustrates an example of reallocating table data and temporary data in a memory buffer according to an embodiment.

DETAILED DESCRIPTION

Described herein are techniques for cooperative memory management. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
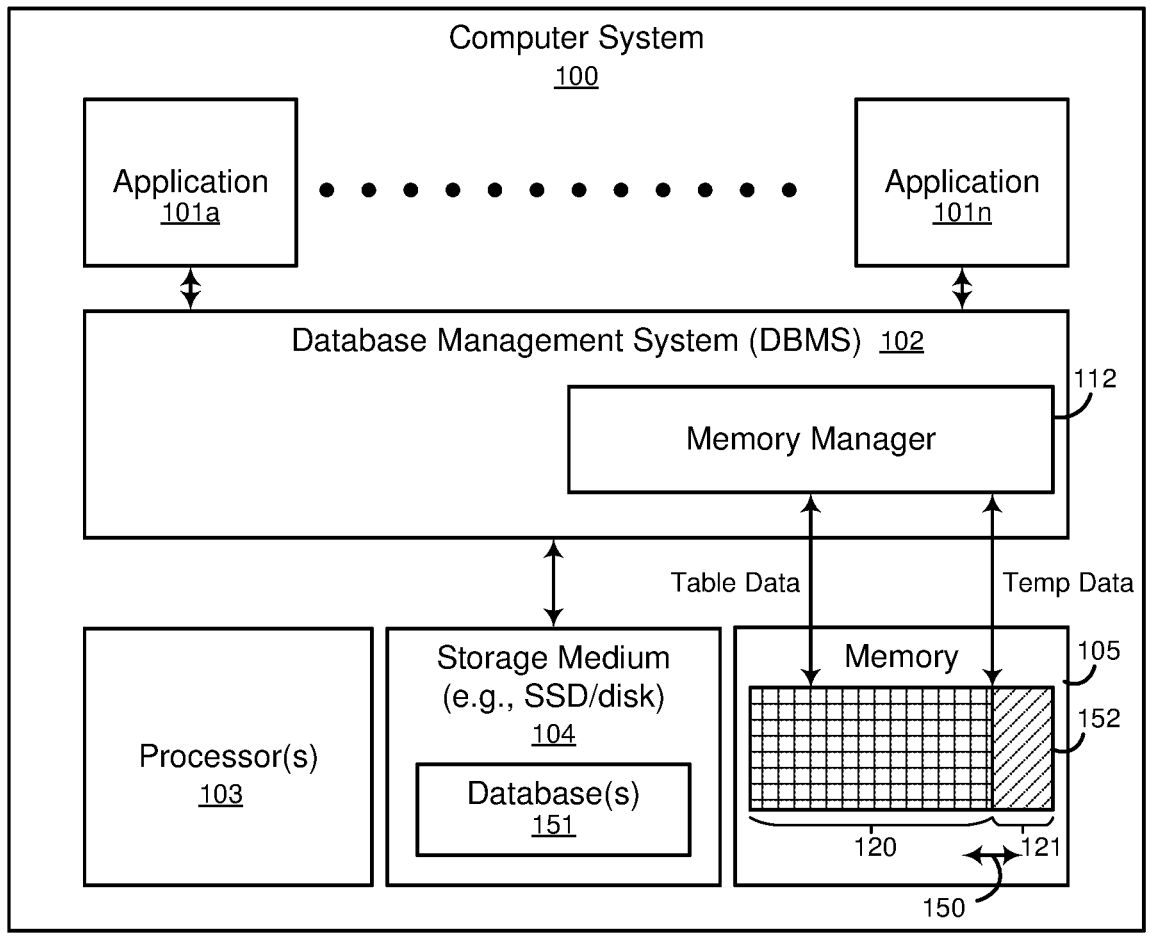
FIG. 1 illustrates a system for cooperative memory management according to an embodiment.

FIG. 1 illustrates a system for cooperative memory management according to an embodiment. Features and advantages of the present disclosure include techniques for dynamically adjusting memory allocations in a database management system between table data and temporary data used for queries, for example. FIG. 1 illustrates a computer system 100 executing one or more software applications 101a-n and a database management system 102 on one or more processors 103. Applications 101-a-n may store and retrieve application data to one or more databases 151 stored in storage medium 104 (e.g., solid state memory or disk drives). Data stored in a database is typically stored in tables. A database management system (DBMS) is a software system for creating and managing databases. A DBMS makes it possible for end users to create, protect, read, update and delete data in a database. DBMS 102 serves as an interface between databases 151 and users or application programs 101a-n, ensuring that data is consistently organized and remains easily accessible. Accordingly, database management system 102 receives queries from applications 101a-n and executes the queries to retrieve data stored in the database 151.

Computer system 100 further includes memory 105, such as random access memory (e.g., RAM, DRAM, or inline memory modules such as DIMMs). Memory 105 is sometimes referred to as main memory. Because transactions with storage medium 104 are slower than transactions with memory 105, DBMS 102 may be provided with an allocation in memory 105 for storing data (typically table data) from database 151 and temporary data required to execute queries. Memory allocated to the DBMS is sometimes referred to as a memory buffer, for example. As mentioned above, memory provided to the DBMS is often allocated between memory for storing table data and memory for storing temporary data. Typically, the memory allocated for table data and memory allocated for temporary data are predefined and static. However, using the techniques described herein, the portions of the memory buffer allocated to the table data and temporary data may be changed on a query by query basis, or even changed during execution of different portions of the a single query. This results in a more efficient utilization of the memory buffer and improvement in the performance and cost efficiency of a DBMS.

Embodiments of the present disclosure include a DBMS 102 including a memory manager 112 for controlling the interaction between DBMS 102 and a memory buffer 152 in memory 105. Memory manager 112 is a software component that dynamically handles allocation/deallocation of both the table data and the temporary data (e.g., on a query by query basis or even multiple times during a single query), wherein the memory used for these allocations/deallocations for both table data and temporary data are coming from a common memory buffer 152 of data available to memory manager 112 (e.g., assigned to memory manager 112 by DBMS 102). Memory manager 112 may, for example, specify a table data allocation 120 and a temporary data allocation 121 in memory buffer 152, where a combination of the table data allocation and temporary data allocation does not exceed a total memory allocation limit of memory available to memory buffer 152 in memory 105, for example. DBMS 102 may retrieve table data from database 151 and instruct memory manager 112 to store the table data in table data allocation 120 of memory buffer 152. Additionally, when executing queries, for example, DMBS 102 may instruct memory manager 112 to store and retrieve temporary data in temporary data allocation 121 of memory buffer 152. Advantageously, memory manager 112 may change the table data allocations and temporary data allocations in response to changing needs of one or more queries. Accordingly, allocations 120 and 121 may be modified by memory manager 112 "on the fly" as illustrated at 150, for example, where the amount of memory available for temporary data may be increased or decreases over time based on query execution requirements.

For example, DBMS 102 may have an initial table data memory allocation 120 and temporary data memory allocation 121. When DBMS 102 receives a new query, DBMS 102 may decrease allocation 120 and increase allocation 121 to provide more memory buffer space for query execution. DBMS 102 may determine an amount of memory to process one or more portions of the query. When new temporary data from the query causes the combination of table data and temporary data to exceed the total memory allocation limit of memory buffer 152, DBMS 102 may instruct memory manager 112 to change allocations 120 and 121 to accommodate additional temporary data needed to process various portions of the query. In response to the instructions, memory manager 112 may modify the table data memory allocation and temporary data memory allocation. Memory manager 112 may reduce the table data memory allocation 120 (e.g., and delete table data as needed) and increase the temporary data memory allocation 121 (e.g., to store temporary data for the query, such as hash tables). Storing and deleting data to and from memory buffer 152 is sometimes referred to as "caching" and "evicting" data. Accordingly, when a combination of the table data and the amount of memory to process one or more portions of the query is greater than the total memory allocation limit, the allocations are changed dynamically so that the combination of the table data in memory buffer 152 and the amount of memory buffer 152 needed to store temporary data for processing the query (or portions thereof) is less than the total memory allocation limit of memory buffer 152. Once the new table data and temporary data allocations are made, memory manager 152 may store temporary data generated by the query (or portions thereof) in memory buffer 152.

Figure 2:
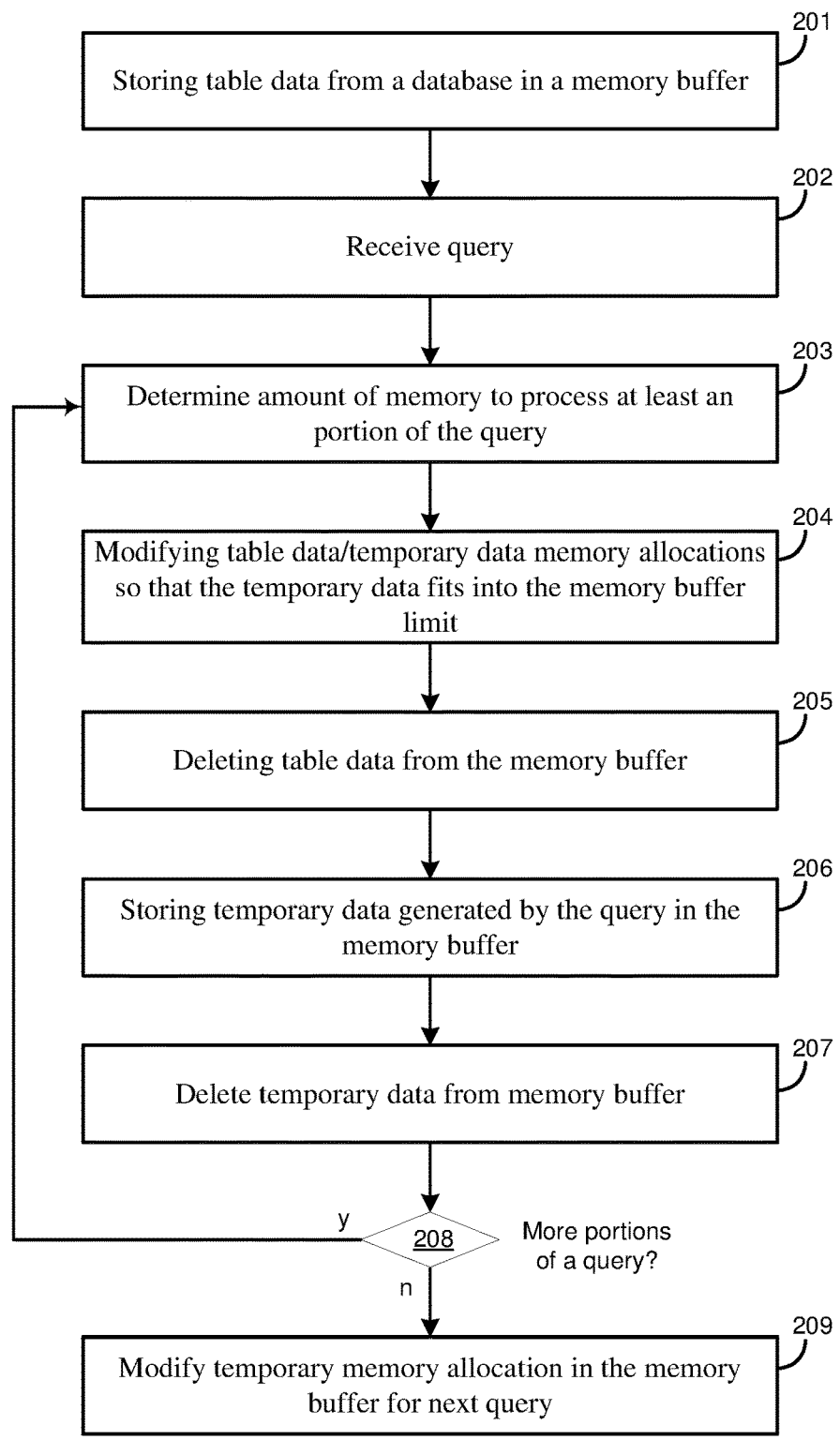
FIG. 2 illustrates a method according to an embodiment.

FIG. 2 illustrates a method according to an embodiment. At 201, a DBMS may store table data from a database in a memory buffer of a random access memory. The memory buffer may include a table data memory allocation for storing table data, a temporary data memory allocation for storing temporary data associated with one or more queries, and a total memory allocation limit. At 202, the DMBS may receive a query. DBMS may generate an execution plan for the query, which may involve multiple different temporary memory requirements at different points of execution of the query, for example. At 203, DBMS may determine an amount of memory to process at least a portion of the query (e.g., an initial portion, subsequent portions, and/or the total query). At 204, DBMS instructs a memory manager to modify the table data memory allocation and the temporary data memory allocation. The memory manager may reduce the table data memory allocation and increase the temporary data memory allocation, for example, when a combination of the table data and the amount of memory to process at least a portion of the query is greater than a total memory allocation limit so that the combination of the table data in the memory buffer and the temporary data is less than the total memory allocation limit for the memory buffer. Reducing the table data memory allocation may include deleting table data from the memory buffer at 205. At 206, temporary data generated by the query (or particular portions of the query) is stored in the memory buffer. At 207, when the query (or portion of the query) is finished processing, then temporary data may be deleted from the memory buffer, for example. At 208, the system determines if there are more portions of a query to be processed. If yes, and the query is completed, then the process returns to 203 and repeats steps 204-207. If not, then the memory used for temporary data may be made generally available again, either for caching table data or for the temporary data of a subsequent query. Accordingly, the temporary data memory allocation in the memory buffer is modified for the next query at 209. A subsequent query may require more or less temporary data. If the subsequent query uses less temporary data, then the table data memory allocation in the memory buffer may be increased, for example.

Figure 3:
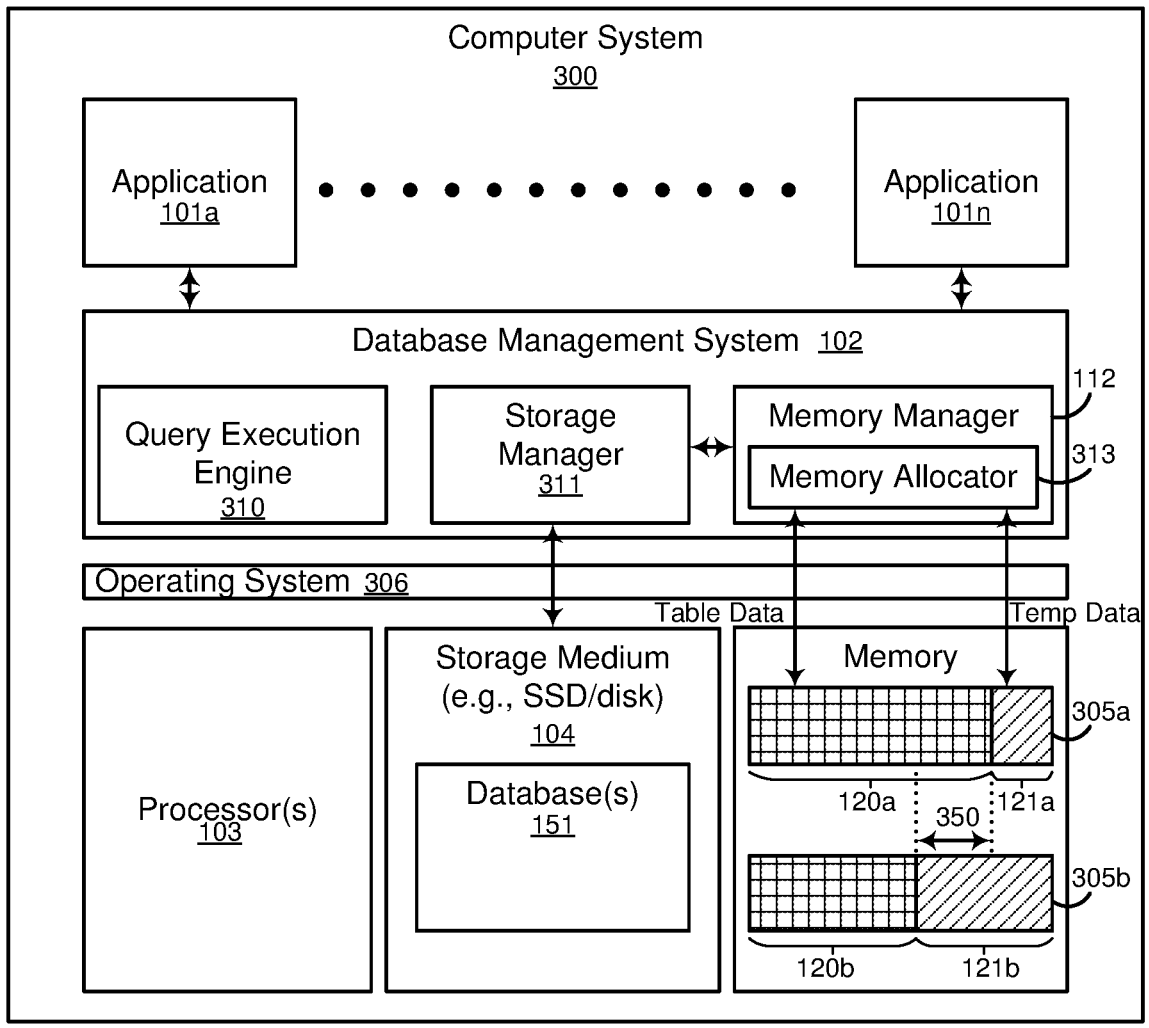
FIG. 3 illustrates another example computer system including cooperative memory management according to an embodiment.

FIG. 3 illustrates another example computer system including cooperative memory management according to an embodiment. In this example, DBMS 102 further includes a query execution engine 310 and a storage manager 311, and memory manager comprises a memory allocator 313 for allocating memory through an operating system 306. DBMS 102 may interface with storage manager 311 to store and retrieve table data to and from database(s) 151. Memory manager 112 may interface with storage manager 311 to store and retrieve table data in database(s) 151 to and from memory buffer 105 in FIG. 1, shown here as 305a/305b to illustrate two different allocations. Memory allocator 313 may communicate with operating system 306 to allocate memory in the memory buffer. For example, memory allocator 313 may communicate with operating system 306 to set the total memory allocation limit for the memory buffer, the table data memory allocation, and the temporary data memory allocation.

DBMS 102 may instruct storage manager 311 to retrieve one or more tables of data and send them to memory manager 112. DBMS 102 then instructs memory manager 112 to store table data in a portion of memory buffer allocated for table data. When DBMS 102 receives a query, temporary data associated with the query may be stored in the portion of the memory buffer allocated for temporary data. An example table data memory allocation 120a and temporary data memory allocation 121a are shown for a memory buffer 305a in an initial state. When another query is received, DBMS 102 may determine that temporary data memory allocation 121a is insufficient to process at least a portion of the query. For example, when the query is received, query execution engine 310 may analyze the query and produce a query execution plan. The query execution plan may require different amounts of temporary data at different points in time during query execution. DBMS 102 may determine that an initial portion of the query requires more temporary memory than is currently allocated. Accordingly, memory allocator 313 may increase the amount of the temporary data memory allocation from 121a to 121b and decrease the amount of the table data memory allocation from 120a to 120b. Prior to decreasing the table data memory allocation 120a, memory manager 112 may delete table data from the memory buffer. Memory buffer 305b illustrates the state of the memory buffer after the new allocations are applied. The change in the memory buffer allocations is illustrated at 350. Once the initial portion of the query is complete, DBMS 102 may instruct memory manager 112 to delete the temporary data associated with the initial portion of the query. One or more subsequent portions of the query (if any) may be analyzed to determine the amount of temporary data to process each subsequent portion of the query, and the temporary data memory allocation may be modified to accurate fit each amount of temporary data needed for the current processing operations. Accordingly, during execution of a query plan, the table data memory allocation and temporary data memory allocation may be advantageously modified dynamically to optimize the use of the available memory buffer space for both table data and temporary data.

Accordingly, the memory buffer is controlled to implement a cooperative memory management that utilizes the low-overhead nature of a vmcache approach, for example, to extend the memory managed through the buffer pool from just cached table data to also include intermediate results, breaking down the barrier between these memory consumers that exists in traditional systems. These techniques may manage all main memory in a way that leaves no memory unused and enables on-demand allocation of temporary data close or up to the memory limit. The present disclosure may solve the problem of inefficient memory usage and complicated memory buffer configurations, for example, and may do away with making the memory usage of different DBMS components configurable altogether. Instead, the system may indifferently serve memory requests for caching table data or for temporary data until the memory limit is reached.

The memory limit (or total memory allocation limit) may be the available DRAM capacity or a user-configured limit, for example. When the limit is reached and new requests arrive, the system should evict cached table data in order to free enough memory to satisfy the request. This way, with enough memory demand, memory is always fully utilized for caching table data when it is not needed for temporary data, but memory for temporary data can still be allocated at any point in time up to the memory limit. This takes the burden of configuring memory areas (e.g., buffer pool size) off of system users, and maximizes the utility gained from the available memory capacity by always using memory not currently used for other purposes to cache table data.

Embodiments of cooperative memory management may be enabled by the central memory manager (described above) that keeps track of the amount of memory allocated to caching table data and to temporary data, and handles requests for either type of memory. Conceptually, the memory manager includes memory buffer management and the ability to also serve memory requests for temporary data. A memory manager may handle all allocations and deallocations in the system and ensures that the total memory allocated both to caching table data and to temporary data never exceeds the memory limit. In various embodiments, the memory manager provides the following interface to the rest of the system:

pin(pid): Pin a table data page, load the page from storage if not already in memory.
unpin(pid): Unpin a table data page.
allocateTemporary(size): Allocate memory for temporary data.
freeTemporary(pointer, size): Free memory previously used for temporary data, which can be reused for caching table data.

Access to data pages may be synchronized among threads, and the memory manager provides at least two variants of the pin( ) and unpin( ) calls, one for shared read-only locking, and one for exclusive write locking. When serving requests for memory (i.e., pin( ) or allocateTemporary( ) calls), the memory manager can simply allocate new memory using the system allocator as long as the total memory use does not exceed the limit. Once the limit is reached, it has to evict (e.g., using an eviction policy) table data pages and free their memory until there is enough space for the new allocation.

In one example embodiment, the only case where an allocateTemporary( ) call cannot be handled occurs when the combination of the new request, already allocated temporary memory, and pinned data pages exceed the memory limit. However, this happens far later with the cooperative approach than in a traditional system, where data pages may not be evicted to make room for temporary data dynamically, for example.

Memory manager functionality may include internally pinning pages exclusively for allocateTemporary( ) calls, and unpinning those pages for freeTemporary( ) calls, for example. This makes it so that buffer frames used for temporary data can be reused for table data after use. Thus, some embodiments of the system may perform all large temporary allocations through the memory manager. With such an implementation, allocation granularity for temporary data may be a multiple of the memory manager's page size, for example.

FIG. 4A illustrates an example query execution plan according to an embodiment. In this example, a DBMS may receive the following query:

SELECT COUNT(*) FROM R, S WHERE R.key=S.key.

The execution plan for the query 401 involves a JOIN operator, where R.key=S.key 402, which requires retrieving pages of table R 403 and table S 404. FIG. 4B illustrates steps performed during query execution according to an embodiment. At 410, the query is received, and the execution plan is produced. Temporary memory for executing the query may be provided to a memory manager. At 411, the memory manager allocates a portion of the memory buffer sufficient to process the query. Table data may be deleted to accommodate more temporary data, for example. At 412, the DBMS reads table R and creates a hash table for joining tuples from R with tuples from S. At 413, the memory manager stores the hash table in the portion of the memory buffer allocated to temporary data. At 414, Table R is scanned and pages are pinned/unpinned (as necessary). At 415, Table S is scanned and pages are pinned/unpinned (as necessary) to perform the JOIN. The system may probe the hash table for R to obtain the query result (e.g., by counting tuples with equal keys). At 416, the query is completed, temporary data for the query is deleted, and the temporary data memory allocation for the query may be released or otherwise removed, for example.

FIG. 4C illustrates an example of reallocating table data and temporary data in a memory buffer according to an embodiment. Various allocations of the memory buffer are illustrated here during different portions of query execution. Initially, at 420, a memory buffer comprises table data and no temporary data. At 421, a determination is made that more memory is needed to store temporary data for a query. For example, the DBMS may determine that 30% of the memory buffer is required for temporary data. The DBMS may issue an allocateTemporary command to the memory manager to allocate the memory buffer. Accordingly, the temporary data memory allocation is increased, and the table data allocation is decreased. Table data is deleted from the memory buffer in this example. At 422, temporary data is stored in the memory buffer. Referring to the query in FIGS. 4A and 4B, table R may be scanned by sequentially pinning/unpinning pages of table R, for example. At 423, pages of tables R and S are pinned and unpinned as needed in the table data portion of the memory buffer and temporary data is stored and deleted as needed in the temporary data portion of the memory buffer. A pin command may check if a page is already cached in the memory buffer. If not, the pin command may cause the memory manager to evict another (unpinned) cached page of table data and load the page from disk. Unpinning marks cached pages of table data that may be deleted after their data has been read and processed, for example. At 424, the query is completed, and the temporary data is deleted. At 425, the table data memory allocation is increased, and the temporary data memory allocation is decreased. After completion of the query, the allocations may be dependent on the next query or other activities of the DBMS.

Figure 5:
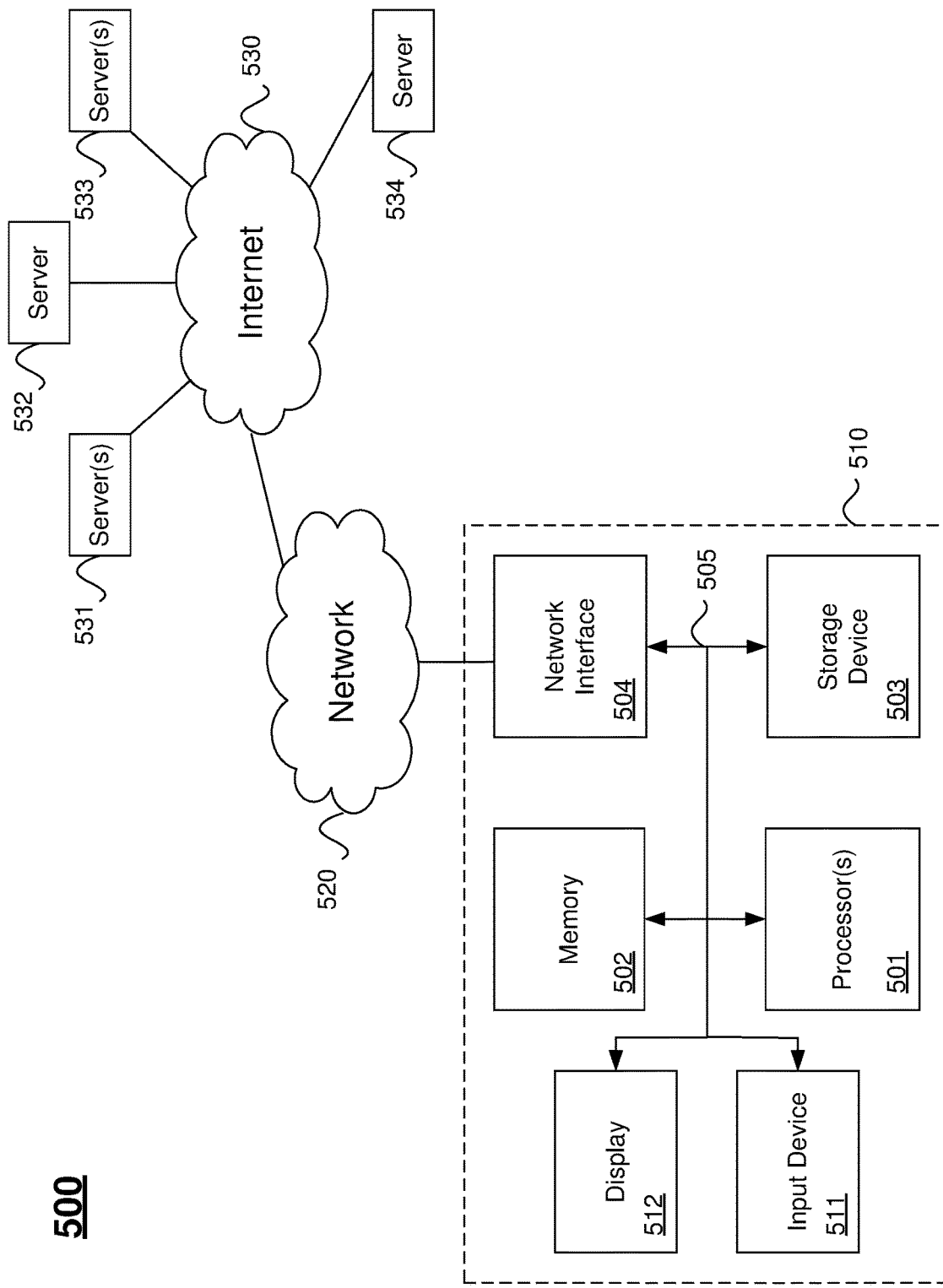
FIG. 5 illustrates hardware of a special purpose computing machine configured according to the above disclosure.

FIG. 5 illustrates hardware of a special purpose computing machine configured according to the above disclosure. The following hardware description is merely one example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a front end (e.g., a browser), for example, may access data and features on backend software systems that may reside on multiple different hardware servers on-prem 531 or across the Internet 530 on servers 532-535. One or more of servers 532-535 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Various embodiments of the present disclosure include a method, a computer system comprising at least one processor, a random access memory, and at least one non-transitory computer readable medium storing computer executable instructions that, when executed by the at least one processor, cause the computer system to perform a method, and/or a non-transitory computer-readable medium storing computer-executable instructions that, when executed by at least one processor, perform a method.

In one embodiment, the present disclosure includes, in a database management system, a method of managing memory comprising: storing, by the database management system executing on a computer system, table data from a database in a random access memory, the random access memory having a database management system memory buffer comprising a table data memory allocation for storing table data, a temporary data memory allocation for storing temporary data associated with one or more queries, and a total memory allocation limit; receiving a query in the database management system; determining, in the database management system, an amount of memory to process at least a portion of the query; modifying, by a memory manager, the table data memory allocation and temporary data memory allocation, wherein the memory manager reduces the table data memory allocation and increases the temporary data memory allocation when a combination of the table data and the amount of memory to process at least the portion of the query is greater than the total memory allocation limit so that the combination of the table data in the memory buffer and the amount of memory buffer to process at least the portion of the query is less than the total memory allocation limit; and storing, by the memory manager, temporary data generated by at least the portion of the query in the memory buffer.

In one embodiment, the memory manager, in response to instructions from the database management system: stores the total memory allocation for the database management system; reduces or increases the table data memory allocation; stores table data into, and deletes table data from, the random access memory; and stores temporary data into, and deletes temporary data from, the random access memory.

In one embodiment, the method further comprising, upon completion of the query: deleting, by the memory manager, the temporary data associated with said at least the portion of the query; and increasing, by the memory manager, the table data memory allocation.

In one embodiment, the portion of the query is an initial portion of the query, the method further comprising: determining a second amount of memory to process one or more subsequent portions of the query; and for the one or more subsequent portions of the query, either: reducing the table data memory allocation so that the combination of the table data and the amount of memory to process a particular subsequent portion of the query is less than the total memory allocation limit; or increasing the table data memory allocation so that the combination of the table data and the amount of memory to process the particular subsequent portion of the query is less than the total memory allocation limit.

In one embodiment, the portion of the query comprises a JOIN function for logically joining at least two tables of data stored, at least partially, in the random access memory, and wherein the one or more subsequent portions of the query comprise one or more JOIN functions for joining one or more additional tables of data stored, at least partially, in the random access memory.

In one embodiment, reducing the table data memory allocation comprises deleting, by the memory manager, a portion of the table data from the memory buffer.

In one embodiment, the database management system comprises a memory allocator for communicating with an operating system executing on the computer system, wherein the memory manager communicates with the operating system through the memory allocator to reduce or increase the table data memory allocation.

In one embodiment, the temporary data is a data structure storing key-value pairs.

In one embodiment, the data structure is a hash table.

In one embodiment, the query is a SQL query.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. In a database management system, a method of managing memory comprising:
    storing, by the database management system executing on a computer system, table data from a database in a random access memory, the random access memory having a database management system memory buffer comprising a table data memory allocation for storing table data, a temporary data memory allocation for storing temporary data associated with one or more queries, and a total memory allocation limit;
    receiving a query in the database management system;
    determining, in the database management system, an amount of memory to process at least a portion of the query;
    modifying, by a memory manager, the table data memory allocation and temporary data memory allocation, wherein the memory manager reduces the table data memory allocation and increases the temporary data memory allocation when a combination of the table data and the amount of memory to process at least the portion of the query is greater than the total memory allocation limit so that the combination of the table data in the memory buffer and the amount of memory buffer to process at least the portion of the query is less than the total memory allocation limit; and
    storing, by the memory manager, temporary data generated by at least the portion of the query in the memory buffer.

2. The method of claim 1, wherein the memory manager, in response to instructions from the database management system:
    stores the total memory allocation for the database management system;
    reduces or increases the table data memory allocation;
    stores table data into, and deletes table data from, the random access memory; and
    stores temporary data into, and deletes temporary data from, the random access memory.

3. The method of claim 1, further comprising, upon completion of the query:
    deleting, by the memory manager, the temporary data associated with said at least the portion of the query; and
    increasing, by the memory manager, the table data memory allocation.

4. The method of claim 1, wherein the portion of the query is an initial portion of the query, the method further comprising:
    determining a second amount of memory to process one or more subsequent portions of the query; and
    for the one or more subsequent portions of the query, either:
        reducing the table data memory allocation so that the combination of the table data and the amount of memory to process a particular subsequent portion of the query is less than the total memory allocation limit; or
        increasing the table data memory allocation so that the combination of the table data and the amount of memory to process the particular subsequent portion of the query is less than the total memory allocation limit.

5. The method of claim 4, wherein the portion of the query comprises a JOIN function for logically joining at least two tables of data stored, at least partially, in the random access memory, and wherein the one or more subsequent portions of the query comprise one or more JOIN functions for joining one or more additional tables of data stored, at least partially, in the random access memory.

6. The method of claim 1, wherein reducing the table data memory allocation comprises deleting, by the memory manager, a portion of the table data from the memory buffer.

7. The method of claim 1, wherein the database management system comprises a memory allocator for communicating with an operating system executing on the computer system, wherein the memory manager communicates with the operating system through the memory allocator to reduce or increase the table data memory allocation.

8. The method of claim 1, wherein the temporary data is a data structure storing key-value pairs.

9. The method of claim 8, wherein the data structure is a hash table.

10. The method of claim 1, wherein the query is a SQL query.

11. A computer system comprising:
    at least one processor;
    random access memory;
    at least one non-transitory computer readable medium storing computer executable instructions that, when executed by the at least one processor, cause the computer system to perform a method comprising:
        storing, by a database management system executing on a computer system, table data from a database in a random access memory, the random access memory having a database management system memory buffer comprising a table data memory allocation for storing table data, a temporary data memory allocation for storing temporary data associated with one or more queries, and a total memory allocation limit;

receiving a query in the database management system;

determining, in the database management system, an amount of memory to process at least a portion of the query;

modifying, by a memory manager, the table data memory allocation and temporary data memory allocation, wherein the memory manager reduces the table data memory allocation and increases the temporary data memory allocation when a combination of the table data and the amount of memory to process at least the portion of the query is greater than the total memory allocation limit so that the combination of the table data in the memory buffer and the amount of memory buffer to process at least the portion of the query is less than the total memory allocation limit; and storing, by the memory manager, temporary data generated by at least the portion of the query in the memory buffer.

12. The computer system of claim 11, wherein the memory manager, in response to instructions from the database management system:

stores the total memory allocation for the database management system;

reduces or increases the table data memory allocation;

stores table data into, and deletes table data from, the random access memory; and stores temporary data into, and deletes temporary data from, the random access memory.

13. The computer system of claim 11, further comprising, upon completion of the query:

deleting, by the memory manager, the temporary data associated with said at least the portion of the query; and increasing, by the memory manager, the table data memory allocation.

14. The computer system of claim 11, wherein the portion of the query is an initial portion of the query, the method further comprising:

determining a second amount of memory to process one or more subsequent portions of the query; and for the one or more subsequent portions of the query, either:

reducing the table data memory allocation so that the combination of the table data and the amount of memory to process a particular subsequent portion of the query is less than the total memory allocation limit; or increasing the table data memory allocation so that the combination of the table data and the amount of memory to process the particular subsequent portion of the query is less than the total memory allocation limit.

15. The computer system of claim 11, wherein reducing the table data memory allocation comprises deleting, by the memory manager, a portion of the table data from the memory buffer.

16. A non-transitory computer-readable medium storing computer-executable instructions that, when executed by at least one processor, perform a method, the method comprising:

storing, by a database management system executing on a computer system, table data from a database in a random access memory, the random access memory having a database management system memory buffer comprising a table data memory allocation for storing table data, a temporary data memory allocation for storing temporary data associated with one or more queries, and a total memory allocation limit;

receiving a query in the database management system;

determining, in the database management system, an amount of memory to process at least a portion of the query;

modifying, by a memory manager, the table data memory allocation and temporary data memory allocation, wherein the memory manager reduces the table data memory allocation and increases the temporary data memory allocation when a combination of the table data and the amount of memory to process at least the portion of the query is greater than the total memory allocation limit so that the combination of the table data in the memory buffer and the amount of memory buffer to process at least the portion of the query is less than the total memory allocation limit; and storing, by the memory manager, temporary data generated by at least the portion of the query in the memory buffer.

17. The non-transitory computer-readable medium of claim 16, wherein the memory manager, in response to instructions from the database management system:

stores the total memory allocation for the database management system;

reduces or increases the table data memory allocation;

stores table data into, and deletes table data from, the random access memory; and stores temporary data into, and deletes temporary data from, the random access memory.

18. The non-transitory computer-readable medium of claim 16, further comprising, upon completion of the query:

deleting, by the memory manager, the temporary data associated with said at least the portion of the query; and increasing, by the memory manager, the table data memory allocation.

19. The non-transitory computer-readable medium of claim 16, further comprising:

determining a second amount of memory to process one or more subsequent portions of the query; and for the one or more subsequent portions of the query, either:

reducing the table data memory allocation so that the combination of the table data and the amount of memory to process a particular subsequent portion of the query is less than the total memory allocation limit; or increasing the table data memory allocation so that the combination of the table data and the amount of memory to process the particular subsequent portion of the query is less than the total memory allocation limit.

20. The non-transitory computer-readable medium of claim 16, wherein reducing the table data memory allocation comprises deleting, by the memory manager, a portion of the table data from the memory buffer.

* * * * *